UNITED STATES PATENT OFFICE.

STEPHEN LOYD, OF DARLINGTON, SOUTH CAROLINA.

TONIC PILL.

SPECIFICATION forming part of Letters Patent No. 356,723, dated January 25, 1887.

Application filed October 26, 1886. Serial No. 217,254. (No specimens.)

*To all whom it may concern:*

Be it known that I, STEPHEN LOYD, a citizen of the United States, residing at Darlington, in the county of Darlington and State of South Carolina, have invented certain new and useful Improvements in Tonic Pills; and I do declare the following to be a full, clear, and exact description of the invention, such as will enable others skilled in the art to which it appertains to make and use the same.

My invention is a medicine to be taken in the form of pills, and has for its object the strengthening of the system and the creating of new strength in persons suffering from a loss of blood and other persons of weak constitutions.

In carrying out my invention to make my pills, I first take two (2) parts of sour-wood, (*Oxydendrum arboreum*,) one (1) part of tansy, (*Tanacetum*,) one (1) part of peach-wood, (*Amygdalus Persica*,) and boil them together for one hour. I then strain this liquid and allow it to evaporate for forty-eight (48) hours. I next heat spring-steel to a welding heat and rub it with hard brimstone, allowing the particles rubbed off to fall in water, thereby cooling them. I then pound these particles to dust. I take four (4) parts of the sulphuret of iron, one (1) of rhubarb, one (1) of aloes, one (1) of sulphate of iron, and one (1) of Cayenne pepper, and mix them thoroughly in a mortar. I then mix with this last composition sufficient of the extract first-above mentioned to make it plastic, and form the compound into pills.

My pills are intended especially for purifying and strengthening the system, and will be found to give great relief in cases of dyspepsia, dropsy, chronic diarrhea, and nearly all liver and kidney complaints.

The pills are preferably made, in weight, of five grains each, and two to three of these should be given after, not before, each meal, the effect of iron tonics being increased by administration during the action of the digestive process.

Having thus described my invention, what I claim, and desire by Letters Patent, is—

The herein-described medicinal pill, consisting of sulphuret of iron, rhubarb, aloes, sulphate of iron, Cayenne pepper, and an extract formed from sour-wood, tansy, and peach-wood, combined in about the proportions stated, substantially as specified.

In testimony whereof I affix my signature in presence of two witnesses.

STEPHEN LOYD.

Witnesses:
   GEO. DARGAN,
   W. F. DARGAN.